United States Patent

Tseng

[15] 3,646,470
[45] Feb. 29, 1972

[54] STIMULATED RADIATION CAVITY STRUCTURE

[72] Inventor: David Y. Tseng, 142 Wendy Drive, Newbury Park, Calif. 91320

[22] Filed: July 16, 1970

[21] Appl. No.: 55,498

[52] U.S. Cl................................................331/94.5, 350/162
[51] Int. Cl...............................................................H01s 3/08
[58] Field of Search.........................331/94.5; 350/147, 162

[56] References Cited

UNITED STATES PATENTS

| 3,248,660 | 4/1966 | Fajans.................................331/94.5 |
| 3,443,243 | 5/1969 | Patel....................................331/94.5 |

FOREIGN PATENTS OR APPLICATIONS

| 984,590 | 2/1965 | Great Britain.........................331/94.5 |

Primary Examiner—William L. Sikes
Attorney—Harry M. Saragovitz, Edward J. Kelly, Herbert Berl and J. D. Edgerton

[57] ABSTRACT

A laser/maser cavity configuration for scanning and amplitude modulating the laser/maser output directly from the cavity reflector. These effects are controlled directly by the cavity reflector; no separate components are required for accomplishing these effects. The scanning and amplitude modulation are obtained by direct angular rotation of one of the cavity reflectors. The rotating reflector is a novel reflection grating that belongs to the class of corrugated structures which exhibit a newly discovered type of Wood anomaly. These corrugated reflection gratings are wavelength selective, power selective and polarization selective according to their structure and angular orientation to the laser/maser cavity. The rotation device may be any system which provides an angular degree of freedom about an axis perpendicular to the longitudinal axis of the cavity. The range of angular scan, the scanning direction, and the level of amplitude modulation are easily calculated from available explicit formulas and graphs.

6 Claims, 1 Drawing Figure

PATENTED FEB 29 1972 3,646,470
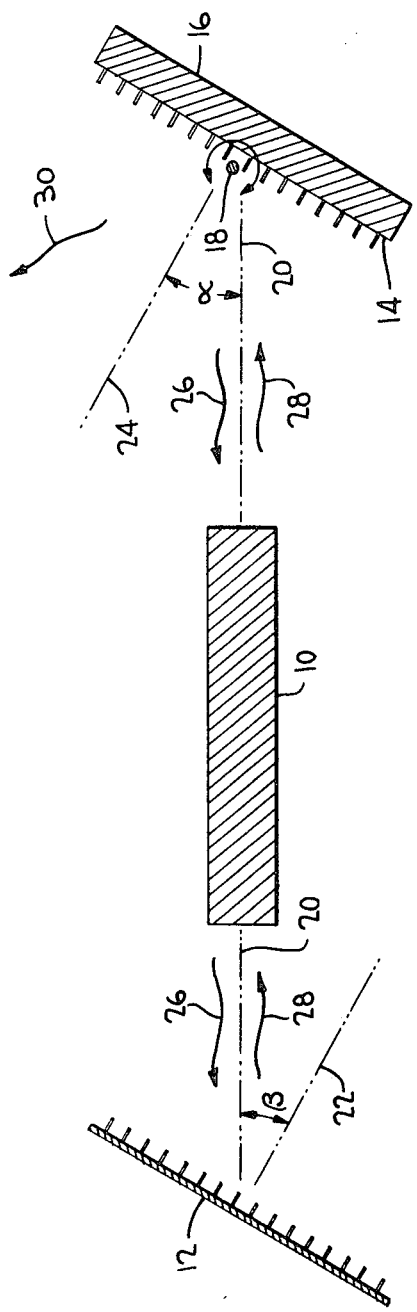
INVENTOR,
DAVID Y. TSENG
BY Harry M. Saragovitz
Edward J. Kelly
Herbert Berl
J. D. Edgerton
ATTORNEYS

STIMULATED RADIATION CAVITY STRUCTURE

RIGHTS OF GOVERNMENT

The invention described herein may be manufactured, used, and licensed by or for the Government of the United States for governmental purposes without the payment to me of any royalty thereon.

BACKGROUND OF THE INVENTION

1. Field of the Invention

This invention relates to laser/maser cavity structures, and more particularly, to novel reflection gratings used in conjunction with such cavities for selective reflection and output coupling of the laser/maser radiation.

2. Description of the Prior Art

Cavities that are utilized for producing coherent electromagnetic radiation in devices commonly referred to as lasers and masers, usually employ at either end of the cavity a pair of highly reflective mirrors to sustain the oscillation by reflecting the radiation back and forth within the cavity to increase the gain. If it is desired to utilize the resultant beam to scan a defined area, external devices and optics are required to direct the beam in the desired direction. In order to amplitude modulate such a beam, one common method has been to direct the beam through a crystal that is externally excited by acoustic waves which are then impressed upon the transmitted laser/maser beam. The crystal thickness and orientation as well as the acoustic wave generator used in such a system must be carefully controlled in order to achieve the desired results. The orientation of the lattice planes within such a crystal is also used to cause the incident laser/maser beam to be redirected or scanned in another area, and thus must also be carefully aligned.

Reflection gratings known as blaze gratings have been substituted for one or both of the cavity reflectors in an attempt to selectively couple out from the cavity certain desired wavelengths of the stimulated electromagnetic radiation. The blaze grating has been at best 60 to 80 percent efficient and heretofore the practical use of such gratings has been limited to experimental cut and try methods, i.e., the profile and reflected amplitudes from such gratings have not been exactly correlated nor has the maximum amplitude reflection possible from any given defracted order been known exactly. Thus, design criteria to enable one to construct a reflection grating according to a particular specification has been heretofore unavailable.

Accordingly, the primary object of the present invention is to provide a cavity for producing coherent electromagnetic radiation in which the cavity output can be scanned and amplitude modulated directly by the cavity itself without the use of external apparatus.

Another object of the present invention is to provide a direct scanning, amplitude modulating laser/maser cavity in which 100 percent grating efficiency is obtainable.

Another object of the present invention is to provide a reflection grating for coupling power out of a laser/maser cavity for which design specifications are available which can be applied to yield a particular angle of reflection or a desired output or an amplitude modulated output.

Still a further object of the present invention is to provide a cavity for producing coherent electromagnetic radiation in which the output beam can be amplitude modulated in a simplified manner by an integral part of the cavity.

An additional object to the present invention is to provide a laser/maser cavity that utilizes reflection gratings for which exact solutions are available for relating the profile of the grating to the amplitude behavior of the diffracted orders.

SUMMARY OF THE INVENTION

Briefly, in accordance with the invention, a cavity for producing coherent electromagnetic radiation is provided in which a corrugated reflection grating is utilized at one end of the cavity for selectively coupling out of the cavity the desired wavelengths, polarization and power of the stimulated radiation. The corrugated reflection grating, for which exact design specifications are available, can be made rotatable about an axis perpendicular to the longitudinal axis of the cavity. This angular degree of freedom allows the output beam to be scanned over a defined area easily controllable by the rotation apparatus attached to the grating. Additionally, the output power of the beam has a direct calculable relation to the angular disposition of the reflection grating and thus provides the system with an amplitude modulation capability. The polarization discrimination characteristics of the corrugated reflection gratings used herein preferentially selects a polarization for which it is designed to operate and will suppress other polarizations of the stimulated radiation. Additionally, an efficiency of 100 percent is obtainable with the use of such gratings.

BRIEF DESCRIPTION OF THE DRAWING

The specific nature of the invention as well as other objects, aspects, uses, and advantages thereof will clearly appear from the following description and from the accompanying drawing, in which:

The FIGURE is a schematic side view of the cavity apparatus in accordance with a preferred embodiment of the present invention.

DESCRIPTION OF THE PREFERRED EMBODIMENT

The properties of reflection gratings for use in conjunction with laser/maser cavities are generally well known in the art. These reflection gratings are used primarily to couple out from the laser/maser cavity a selected wavelength and amplitude of the electromagnetic radiation oscillating within the cavity structure. I have recently discovered new phenomena in grating theory belonging to the class of Wood anomalies. See *GUIDING AND SCATTERING OF ELECTROMAGNETIC FIELDS BY CORRUGATED STRUCTURES*, David Y. Tseng, Ph.D. Thesis, Polytechnic Institute of Brooklyn, 1967. This thesis dealt with an analysis of the guiding and plane wave scattering of electromagnetic fields by planar corrugated structures. Explicit expressions for the dispersion relation and reflection coefficients were derived for the TM and TE polarizations. The foregoing study uncovered new and useful properties of corrugated reflection gratings that make them particularly desirable for use in the device of the present invention.

A planar corrugated structure of the type envisioned for use in the present invention consists ideally of a perfectly conducting ground plane terminating in an array of parallel, perfectly conducting fins attached perpendicularly to the ground plane. The fins are spaced periodically at a distance D, and form corrugations of depth H. The aforementioned study yielded some rather remarkable properties of corrugated gratings. For example, 100 percent reflection efficiency is possible for a selected fin-spacing D, corrugation depth H, angle and frequency of the incident wave. Additionally, design specifications were made explicitly available such that for a desired direction and amplitude of the reflected wave the parameters of a corrugated grating could be determined and built according to the specifications. This is a particularly useful property heretofore unavailable with ordinary reflection gratings. Equation 2-15 of the foregoing thesis gives the reflection coefficients, i.e., the reflection amplitudes, for the various propagating diffracted spectral orders for which explicit expressions were developed, thus yielding exact solutions to relate the profile of the corrugated grating to the amplitude behavior of the diffracted orders. These properties clearly make the corrugated grating invaluable as a reflection grating in the laser/maser cavity of the present invention as explained hereinafter.

Referring now to the figure, a preferred embodiment of the cavity structure is shown which illustrates schematically an active medium and pumping source 10 having a longitudinal axis 20. The highly reflective mirrors normally associated with such a cavity at both ends are replaced in the device of the present invention by the corrugated reflection gratings 12 and 14 disposed at an angle of $\beta$ and $\alpha$ respectively to longitudinal axis 20. It is understood that reflection grating 12 may be replaced by a conventional mirror or conventional reflector if desired without effecting the operation described hereinafter; or reflection grating 12 may be rotated by an angle $2\beta$ in the counterclockwise direction without effecting the operation of the cavity. An angular orientation device 16 is attached to reflection grating 14 to provide an angular degree of freedom for grating 14 about an axis 18 perpendicular to longitudinal axis 20, and may be of any common mechanical or electromechanical system. The normal to reflection grating 12 is represented by line 22, while the normal to reflection grating 14 is represented by line 24. For purposes of illustration, arrows 26 represent an incident electromagnetic wave within the cavity while arrows 28 represent a reflected electromagnetic wave that has been reflected from reflection grating 12. For these purposes, reflection grating 12 will be designed so that 100 percent of incident wave 26 will be backscattered along axis 20, as represented by reflected wave 28. Corrugated reflection grating 14, on the other hand, can be designed so as to couple out a portion of wave 28 at a desired angle and amplitude that is determined by the orientation of device 16. The wavelength and polarization selective grating 14 will effectively filter from all the wavelengths present within the cavity a particular wavelength and polarization to be coupled out of the cavity as represented by electromagnetic wave 30. The direction of output wave 30 is controllable by the angular variation of grating 14 which provides the device of the present invention with an extremely simple scanning capability. Since the aforedescribed corrugated reflection gratings allow an exact solution to relate the profile of the grating to the amplitude behavior of the diffracted orders, it follows that the output power of wave 30 is controllable by angular variation of grating 14. The range of angular scan, the scanning direction, and the level of amplitude modulation provided by the unique combination of corrugated reflection grating 14 and angular orientation device 16 are easily calculated from explicit formulas and graphs available in the aforedescribed doctoral dissertation.

It is seen that I have provided a laser/maser cavity configuration which can scan and amplitude modulate the laser/maser output directly from the cavity reflector. No external components distinct from the cavity itself are required for accomplishing these effects; they are obtained and controlled by direct angular rotation of one of the corrugated reflection gratings. The apparatus is extremely valuable in that any of a number of wavelengths and polarizations oscillating within the active medium can be coupled out of the cavity at a predictable angle and furthermore, such outputs may be scanned over an easily controllable area and amplitude modulated by the same means.

I wish it to be understood that I do not desire to be limited to the exact details of construction shown and described, for obvious modifications will occur to a person skilled in the art.

I claim as my invention:

1. A cavity for producing coherent electromagnetic radiation, comprising:
   a. a pumping source for stimulating the emission of radiation from an active medium;
   b. means located at a first end of said cavity for reflecting said stimulated radiation back through said cavity; and
   c. a corrugated reflection grating located at a second end of said cavity for selectively reflecting a portion of said stimulated radiation back through said cavity and for selectively coupling out of said cavity the remaining portion of said stimulated radiation.

2. The invention according to claim 1 wherein said corrugated reflection grating comprises a conducting ground plane terminating in a multiplicity of parallel fins attached perpendicularly to said ground plane.

3. The invention according to claim 2 wherein said selectively coupled out portion of said stimulated radiation is selected by said corrugated reflection grating according to predetermined wavelengths and polarizations whereby said cavity suppresses the output of undesired wavelengths and polarizations.

4. The invention according to claim 3 further comprising angular orientation means connected to said corrugated grating for enabling said grating to be rotated about an axis perpendicular to the longitudinal axis of said cavity whereby the output portion of said stimulated radiation can be scanned over a defined area by rotating said angular orientation means.

5. The invention according to claim 4 wherein a particular output power of said stimulated radiation is selectively coupled out from said cavity by virtue of a particular angular orientation of said corrugated grating whereby the output portion of said stimulated radiation can be amplitude modulated by rotating said angular orientation means.

6. The invention according to claim 5 wherein said reflecting means located at said first end of said cavity comprises a corrugated reflection grating that selects specific wavelengths and polarizations of said stimulated radiation for reflection back into said cavity.

* * * * *